INVENTORS
PETER DOSCH
MANFRED OEHMANN
BY
ATTORNEYS

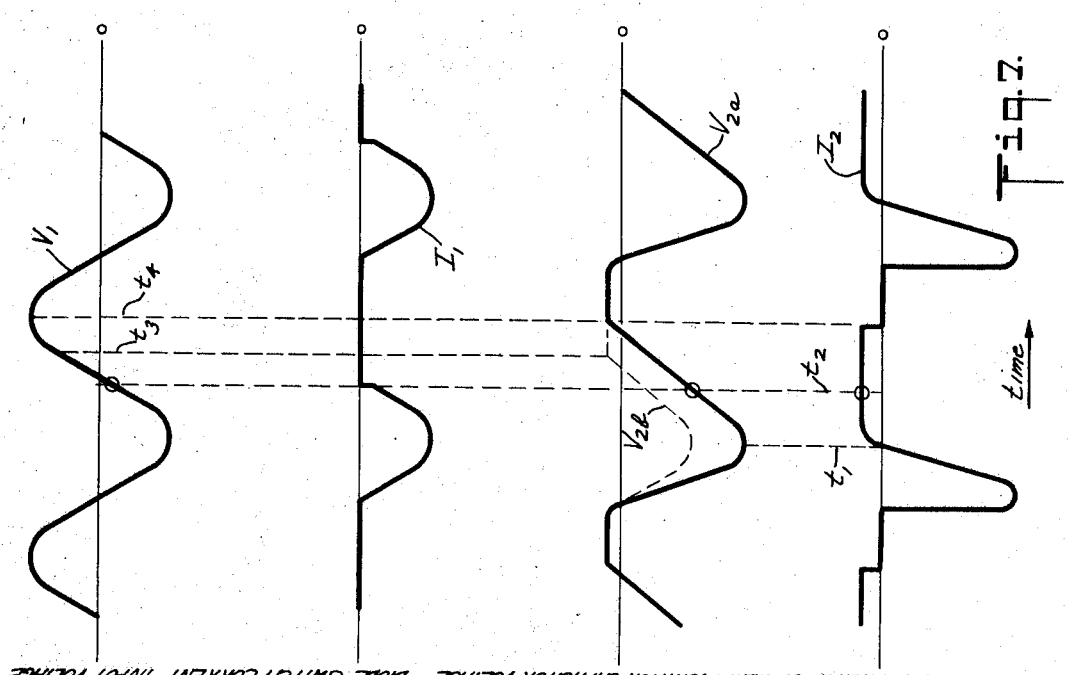
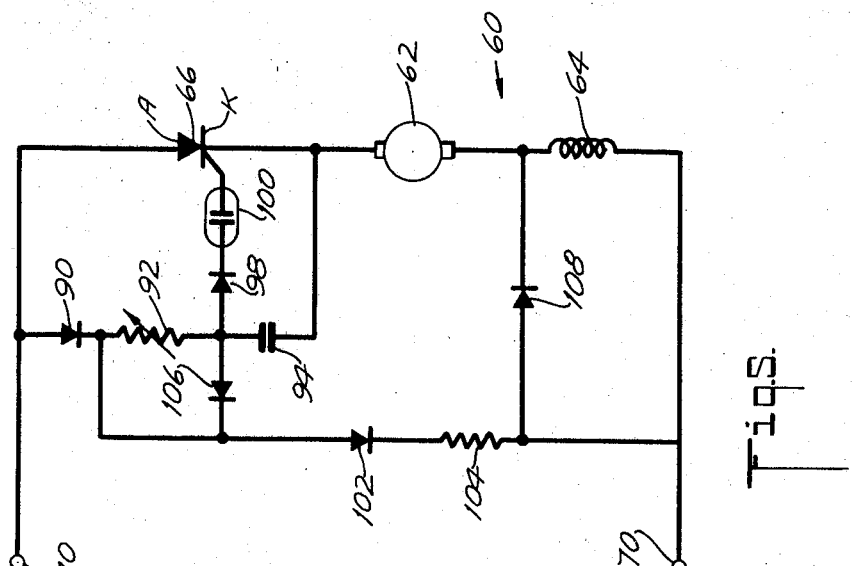

United States Patent Office 3,508,134
Patented Apr. 21, 1970

3,508,134
ELECTRONIC MOTOR CONTROL CIRCUITS RESPONSIVE TO BACK EMF
Peter Dosch, Im Rank, Jona, and Mandred Paul Oehmann, Wattwil, Switzerland, assignors to Heberlein & Co. AG., Wattwil, Switzerland, a corporation of Switzerland
Continuation-in-part of application Ser. No. 504,917, Oct. 24, 1965. This application Dec. 6, 1966, Ser. No. 599,541
Claims priority, application Switzerland, May 25, 1965, 7,313/65
Int. Cl. H02p 5/16
U.S. Cl. 318—331        8 Claims

ABSTRACT OF THE DISCLOSURE

Electronic motor control circuits for regulating the speed and torque of DC shunt motors under varying load conditions the circuit comprising means for comparing the back EMF of the motor with the breakdown potential of a trigger element to achieve low speed regulation, and further including means for comparing the motor back EMF with the applied supply voltage in the higher speed range.

---

This is a continuation-in-part of a copending U.S. Patent application Ser. No. 504,917 filed Oct. 24, 1965, and now abandoned.

This invention relates to electronic motor controls and more particularly it concerns a novel control circuit for regulating the speed and torque of D.C. shunt type motors which operate under varying load conditions.

The present invention makes use of solid state regulating elements called control rectifiers or Thyristors. Such devices, which are also known as Trinistors, Thyrodes, or Silicon Controlled Rectifiers (SCR's), operate in the manner of a diode in that they are capable of conducting current in a single direction. These control rectifiers however are provided with a control electrode and they are incapable of passing current until a certain amount of current is flowing into the control electrode. In this way, a switching action is produced. These controlled diodes, once triggered into their conductive states, remain conductive even after the trigger current is removed from their control electrode.

In the arrangement of the present invention, conventional alternating voltage networks are used to supply power to a D.C. shunt wound motor and to a motor regulator. The advantages of the particular circuit hereinafter described, are found in the fact that they require less expensive components than do known circuits performing similar operations; and further, by virtue of a unique arrangement, various individual elements are used to perform several functions so that the overall complexity and expense of the circuit is considerably reduced.

It is known to use control rectifiers such as Thyristors to regulate the phase of alternating voltages applied to D.C. motors in order to control the torque and speed of the motor. In the most simple of these speed control arrangements, the circuit operates to control the phase of the applied A.C. signal independently of the load on the motor or of the motor speed. In other regulating circuits, the so-called "back EMF" of the motor armature (reverse voltage produced across the armature windings produced by generator action of the spinning armature), is compared with a given nominal voltage. The nominal voltage is usually obtained by tapping off from the supply through a resistance bridge circuit. This nominal voltage is then compared with the armature back EMF. Such technique, unfortunately, results in a rather large power loss.

In all known prior techniques for regulating D.C. shunt connected motors by means of Thyristors or similar control elements, the circuits involved were either quite expensive or required components having very critical characteristics. Furthermore, while many of these circuits operated satisfactorily at high motor speeds, they became very unsatisfactory at lower speeds. At the lower speeds, the small back EMF of the armature was so slight in comparison with the nominal voltage which was derived from the alternating input signal that variations in timing would occur. Also, where regulation was obtained by producing a phase shift of the nominal signals from the applied A.C. input signal by means of an inductance or a capacitance, the flattening out of the phase shifted nominal signal in certain regions of phase shift made precise comparison between the nominal and the armature voltage impossible.

Other difficulties affecting the control of low speed operation with prior regulating circuits arise from the usual variations in armature slotting which causes a disturbing influence on the armature back EMF. In many cases this produced poor regulating characteristic and unstable phase control at low motor speeds when using these prior control systems.

All of the above disadvantages have been avoided in the arrangement of the present invention. According to the present invention there is provided a novel circuit which regulates motor speed and torque in the lower speed range by comparing the armature back EMF of the motor with the breakdown potential of a trigger element. This same circuit regulates motor speed and torque in the higher speed range by comparing the armature back EMF of the motor with the applied supply voltage.

In a specific embodiment there is provided a capacitor which is connected to charge at a given rate in a first direction by the back EMF during the negative half wave of the applied voltage cycle and which charges in the opposite direction at a different rate during the positive half wave. A voltage sensitive trigger element is provided to break down and allow current to flow through the motor armature winding when the positive half wave charge across the capacitor reaches a given value. Means are also provided to limit the amount of negative charge on the capacitor to a given value so that at higher motor speeds, regulation is independent of the effect of the back EMF during the negative half wave. Special circuit arrangements are also provided for fail safe and protective operation and to enable multiple function use of a small number of components.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 5 is a schematic of a circuit forming a still further embodiments of the present invention;

FIG. 6 is a schematic of a circuit forming yet another embodiment of the present invention; and FIG. 7 is a series of wave forms indicating the time variation of current and voltage through various components of the circuit of FIG. 6 during its operation.

Figure 1:
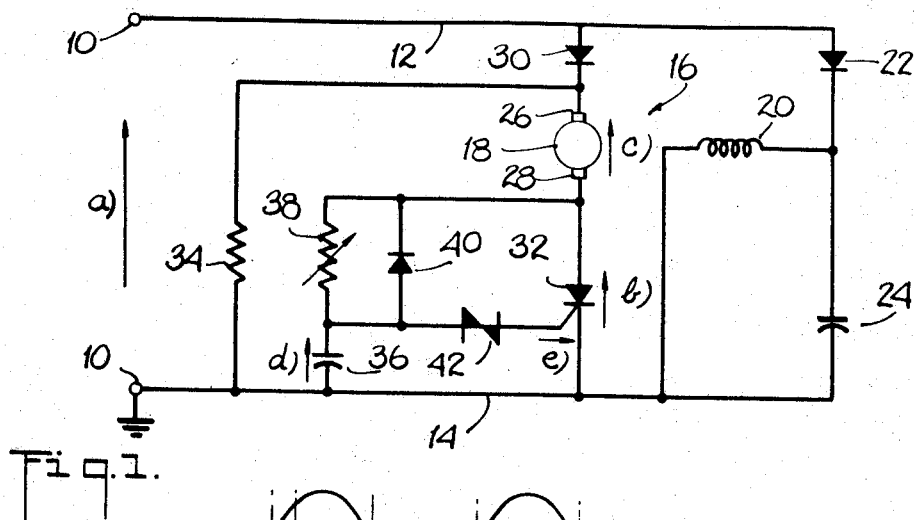
FIG. 1 is a schematic of a circuit forming an illustrative embodiment of the invention.

As shown in the circuit diagram of FIG. 1, there are provided a pair of input terminals 10 to which are applied a continuous alternating voltage from a power source (not shown). Upper and lower conductors 12 and 14 extend out from each of the input terminals 10 respectively. A motor, indicated generally at 16, and comprising an armature winding 18 and a field winding 20 is connected between the upper and lower conductors 12 and 14 in the following manner: The field winding 20 is connected in series with a field diode 22 between the upper and lower conductors 12 and 14. The field winding 20 thus receives the input voltages subjected to half wave rectification. A field capacitor 24 is connected across the field winding 20 and operates to smooth the fluctuations of this applied field voltage.

The armature winding 18 makes contact with a pair of upper and lower brushes 26 and 28 connected respectively between the upper and lower conductors 12 and 14.

An armature diode 30 is connected between the upper conductor 12 and the upper brush 26 with its anode arranged to pass current in a direction toward the upper brush 26. A solid state switch such as a silicon controlled rectifier (SCR) or a Thyristor 32 is connected between the lower brush 28 and the lower conductor 14 in a direction such that it passes current toward the lower conductor 14. There is thus provided a complete armature connection extending serially between the upper and lower conductors 12 and 14, and comprising the armature diode 30, the upper brush 26, the armature winding 18 of the motor 16, the lower brush 28, and the Thyristor 32.

A charging resistor 34 is connected between the lower conductor 14 and a point between the armature diode 30 and the upper brush 26. There is also provided an R–C timing circuit comprising an ignition capacitor 36 and a variable resistor 38 connected in series between the lower conductor 14 and a point between the lower brush 28 and the Thyristor 32. A bypass diode 40 is connected across the variable resistor 38 in a direction such that it passes current toward the lower brush 28. Finally, a trigger element 42, comprising a solid state element capable of passing current only after the voltage across it exceeds a predetermined value, is connected between the control electrode of the Thyristor 32 and a point between the ignition capacitor 36 and the variable resistor 38. The trigger element 42 may comprise an envelope filled with a gas which ionizes to become conductive when the voltage across its terminals exceeds a given value. The resistance of the element, of course, decreases above the ionizing voltage so that the element exhibits a Zener breakdown effect. The element 42 moreover is symmetrical in that its Zener breakdown characteristic occurs in two directions so that the element will conduct when either the positive or negative voltage across it exceeds a certain value.

Operation of the system occurs in the following manner. Alternating voltages are applied across the input terminals 10 and through the upper and lower conductors 12 and 14. These voltages are applied to the field diode 22 which clips their negative portions and applies their positive portions to the field winding 20. The variations in these clipped half-wave voltages are smoothed by the field capacitor 24.

The voltages across the upper and lower conductors 12 and 14 are also applied across the armature diode 30, the armature winding 18 and the Thyristor 32. The Thyristor 32 and the armature diode 30 cooperate to clip the negative portions of the applied voltage waves. The positive portions of the voltage waves are passed through the armature winding 18 whenever the Thyristor 32 is made conductive. Motor control is thus effected by making the Thyristor 32 conductive at certain points during the positive portions of each of the applied voltage waves or cycles.

In prior circuits utilizing Thyristors, the Thyristor besides being a phase control element also served as the sole rectifying for the armature circuit of the motor. As a result the Thyristor had to be designed for high reverse voltages for it had to withstand not only the negative going voltage applied to the input terminals 10 but also had to withstand the additional back EMF of the armature winding. This, of course, resulted in very complex and expensive protective arrangements. In the present circuit, the armature diode 30 serves to withstand the negative half wave of the applied input voltage, or at least a portion thereof, so that it cooperates with the Thyristor 32 to distribute the negative voltages during the negative half wave.

Figure 2:
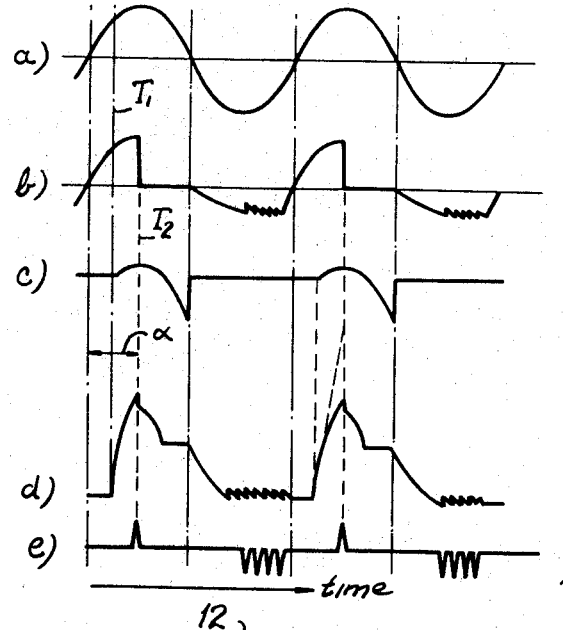
FIG. 2 is a series of wave forms indicating the relationship of voltages across certain components of the circuit of FIG. 1 during its operation.

The manner in which the present arrangement operated to achieve its particular advantages can best be understood by reference to the voltage wave forms shown in FIG. 2 which represent the voltages across certain of the components during various portions of the operation. Thus wave form (a) in FIG. 2 represents the applied input voltage across the terminals 10. The wave form (b) represents the voltage across the Thyristor 32. The wave form (c) represents the voltage across the armature winding 18 of the motor 16. The wave form (d) represents the voltage across the ignition capacitor 36; and the wave form (e) represents the control electrode to cathode voltage across the Thyristor 32.

During the negative half waves of the applied input voltage, the Thyristor 32 and the armature diode 30 are reversed with respect to the applied voltages and therefore the armature circuit of the motor 16 is effectively opened with respect to these voltages. However during this time, the back EMF produced across the brushes 26 and 28 by the generator action of the armature winding during this half-cycle passes through a closed circuit comprising the charging resistor 34, the ignition capacitor 36 and the bypass diode 40. Accordingly, during this time, the ignition capacitor 36 will achieve a charge which is a function of the armature back EMF, and of the R-C time constant of the charging resistor 34 and the ignition capacitor 36. Since the back EMF produced by the generator action of the motor armature winding 18 is in a direction opposite to the applied voltage across the conductors 12 and 14, the upper brush 26 will be positive with respect to the lower brush 28 during this time. Thus, the charge produced across the capacitor is such that the upper plate of the capacitor 36 is negative with respect to its lower plate. This capacitor charge, as will be described is used to control the speed and torque of the motor during the positive half wave of the applied voltage at lower speed.

The present circuit operates to produce motor control in two different ways depending upon the speed at which the motor happens to be running. Thus when the motor is running at low speed, the circuit operates to regulate motor speed based upon a comparison between the armature back EMF and the break down or threshold voltage of the trigger element 42. On the other hand, when the motor is operated at high speed, the circuit operates to control speed based upon a comparison between the armature back EMF and the voltage applied across the input terminals 10.

Considering first low speed operation, it will be noted that during the negative half-wave of the applied voltage, the ignition capacitor 36 is charged so that its upper plate becomes negative by the back EMF. The amount of this charge is proportional to the armature speed of the motor. As the applied voltage swings over to the positive half-wave, current begins to flow through the armature diode 30 and through the charging resistor 34 to the lower conductor 14. Eventually however, at a point shown at T1 in FIG. 2, the applied input voltage will have reached a level where it exceeds the back EMF generated by the armature winding 18. At this point, current is forced through motor and through the variable resistor 38 toward the ignition capacitor 36. Depending upon the degree of negative charge with the ignition capacitor 36 receives during the negative half-wave, it will eventually, as indicated at T2, reach a sufficient positive voltage to overcome the breakdown potential of the trigger element 42. When this occurs, an avalanche of current flows through the control electrode of the Thyristor 32 thus opening the Thyristor and allowing the remaining portion of the positive half-wave applied across the input terminals to flow directly through the armature winding 18 of the motor. Also, during this time the ignition capacitor 36 completely discharges through the bypass diode 40 and the Thyristor 32.

It will be appreciated that the faster the armature winding 18 rotates, the larger its back EMF becomes and the greater is the negative charge produced on the ignition capacitor 36 during each negative half-wave. Thus, it will take longer for the ignition capacitor 36 to reach a sufficient potential during the positive half-wave to cause breakdown of the trigger element 42 and opening of the Thyristor 32. Conversely, the lower the armature speed, the less negatively charges the ignition capacitor 36 becomes during the negative half-wave, and thus less time will be required during the positive half-wave to bring the capacitor 36 up to firing potential. When the threshold or breakdown voltage of the trigger element 42 is reached, a short positive current impulse of a duration of approximately 10 microseconds reaches the control electrode of the Thyristor 32, thus influencing it sufficiently to cause it to open. It can be seen that the ignition angle (in FIG. 2) or phase relationship of input voltage to armature voltage is regulated by the difference between the armature back EMF which controls the voltage on the ignition capacitor 36 and the breakdown voltage of the trigger element 42. It is in this way that the motor speed is regulated during low speed operation.

Considering now high speed operation, it will be noted that during the negative half-wave of the applied voltage, the back EMF generated by the armature winding 18 produces a considerable charge across the ignition capacitor 36. This charge is so great in fact as to exceed the reverse breakdown voltage of the trigger element 42 thus limiting the charge produced upon the ignition capacitor 36 to a fixed value for all motor speeds in excess of that which causes a breakdown of the trigger element 42. During the positive half cycle, current from the upper conductor 12 will not be supplied to the armature winding 18 until the voltage at the upper conductor 12 rises to a point where it exceeds the back EMF generated by the armature winding and stays in excess of that voltage for a period long enough to permit the charge on the upper plate of the ignition capacitor 36 to rise above the positive breakdown voltage of the trigger element 42. When this occurs, the trigger element will pass an avalanche of current through the Thyristor 32, permitting it to conduct, and thus allowing current from the upper conductor 12 to flow through the armature winding 18.

It will be noted that at high speed conditions motor control is based solely upon the relationship of the armature winding back EMF and the voltage applied at the upper conductor 12. During low speed operation, on the other hand, the back EMF is used in determining the firing point of the Thyristor 32.

The dual manner in which the back EMF of the armature winding 18 is used for regulation of speed at various motor loads is a particularly advantageous feature of the present invention. Furthermore, the invention provides another important advantage in that the formation of the difference between control voltages and armature back EMF, as described above, is effected at temporarily different phases. This serves to minimize the power loss in the regulating circuit, since no simultaneous mixture of actual and nominal signal is required. The power required for ignition of the Thyristor 32 is absorbed only for a very short interval. Furthermore, this power, which is taken from the ignition capacitor 36 is stored up over a large interval so that no apparent power drain takes place.

The economy of the present circuit is achieved by multiple utilization of each of the various components as outlined in the following summary:

(a) The armature diode 30 reverses the negative half-wave of the applied voltage and thus permits the use of a Thyristor 32 of the type which has a low reverse voltage characteristic. The greater the resistance, the armature diode 30 have to reverse or negative half-wave voltages, the better it protects the Thyristor 32 during the negative half-wave. Furthermore, the armature diode 30 serves to aid regulation of the motor in that it cooperates with the variable resistor 38 and the ignition capacitor 36 to vary the voltage applied to the trigger element 42 in accordance with the amount by which the voltage on the upper conductor 12 exceeds the back EMF produced by the armature winding 18. Furthermore, the armature diode 30 permits a negative charge to be built up on the ignition capacitor 36 during the negative portion of the applied voltage wave by decoupling the upper conductor 12 from the charging network during this interval.

(b) The charging resistor 34 operates to close a circuit between the armature winding 18 and the ignition capacitor 36 so that the reverse EMF produced by the armature winding 18 during the negative portion of the applied voltage wave will serve to impose a charge across the ignition capacitor 36. The charging resistor 34 additionally operates to permit the flow of current through the armature diode 30 immediately at the beginning of the positive half-wave. Also, it serves to complete a circuit from the upper conductor 12 through the armature diode 30 to the lower conductor 14 and the ignition capacitor 36. This last mentioned circuit operates to change the charge across the capacitor 36 as soon as the upper conductor voltage exceeds the back EMF produced by the armature 18.

(c) The bypass diode 40 serves, during the negative half-wave portion of the applied voltage wave, to bypass the variable resistor 18 so that the back EMF generated by the armature winding 18 is limited in its charging ability only by the parameters of the charging resistor 34 and the ignition capacitor 36. This, of course, permits negative loading of the ignition capacitor 36 by an amount necessary for regulation in cooperation with the reverse armature EMF produced during the negative half-wave of the applied voltage cycle. In addition the bypass diode 40 cooperates with the trigger element 42 to prevent the occurrence of any excessive control electrode to anode voltages across the Thyristor 32, thus protecting the Thyristor.

(d) The trigger element 42 possesses a very high resistance characteristic in the range between its positive and negative threshold or breakdown voltages. This, of course, makes it possible to utilize high resistance control and regulation circuits. This also serves to prevent the accumulation of excessive negative voltages at the anode of the Thyristor 32, thus protecting the Thyristor.

Figure 3:
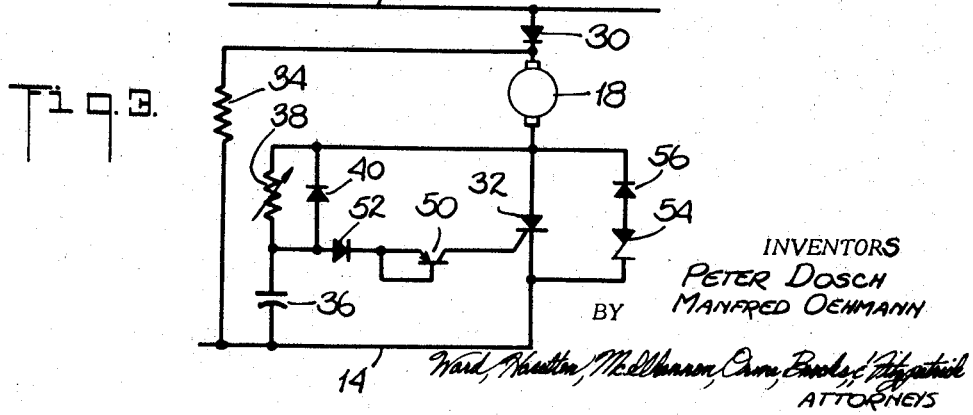
FIG. 3 is a schematic of a modified circuit according to the present invention.

It is, of course, possible to substitute other components such as trigger transistors or unijunction transistors in place of the trigger element 42. FIG. 3 shows a circuit arrangement which incorporates a trigger transistor 50. It will be noted that the arrangement of the ignition capacitor 36, the variable resistor 38 and the bypass diode 40 is the same as in the arrangement of FIG. 1. It is however, preferable when using a trigger transistor, additionally to incorporate a diode such as a protective diode 52 as shown between the capacitor 36 and the trigger transistor 50 in such a manner that the diode will serve to isolate the trigger transistor from the negative charges produced on the capacitor 36.

It will be noted that the protective diode 52 prevents the limitation of maximum negative charge across the ignition capacitor 36 and therefore leaves the anode of the Thyristor 32 exposed to an unlimited negative voltage. This difficulty is overcome in the present situation by means of a secondary circuit comprising a Zener diode 54 and a further diode 56 connected in opposing directions and in series across the anode and cathode of the Thyristor 32. When the anode of the Thyristor 32 is more positive than its cathode, the further diode 56 will ensure that current flows through the Thyristor 32 and not around it. On the other hand, when the anode of the Thyristor 32 reaches a voltage which is more negative than the cathode voltage the magnitude of this voltage is limited by the breakdown of the Zener diode 54.

The above described circuits operate to control of the rotational speed and torsional moment of a direct current shunt connected motor. By further development of this process, it is also possible to control, according to the present invention, the rotational speed and the torsional moment of a direct current, series connected motor in a quite similar manner. This present process also makes use of a Thyristor circuit with a phase cut off control; and as in the above described process, a mixture of actual input voltage value and predetermined current value is effected in two successive time periods in such manner that in the first period the armature voltage value is stored or memorized in an analog value device and in the subsequent period a variable current of desired intensity derived from the difference between the input voltage and the armature voltage.

The invention as used in conjunction with series connected motors, also employs a Thyristor circuit. This Thyristor circuit contains an ignition capacitor which, on one hand, is connected with the cathode of the Thyristor and, on the other hand is connected via a trigger element with the control electrode of the Thyristor. Additionally the capacitor terminal situated opposite the Thyristor cathode is connected with a discharge diode as well as with a variable resistance via which the ignition capacitor is charged during each positive half wave of the network voltage. This charging occurs until the capacitor voltage is sufficient to fire the trigger element which in turn fires the Thyristor. The rotor or armature circuit is arranged in conjunction with the ignition capacitor in such a manner that the capacitor is reversely or negatively charged during each negative half wave to a voltage approximately proportional with the EMF induced during the negative half wave in the rotor by the field coil; such voltage being also proportional to the rotational speed of the rotor.

Figure 4:
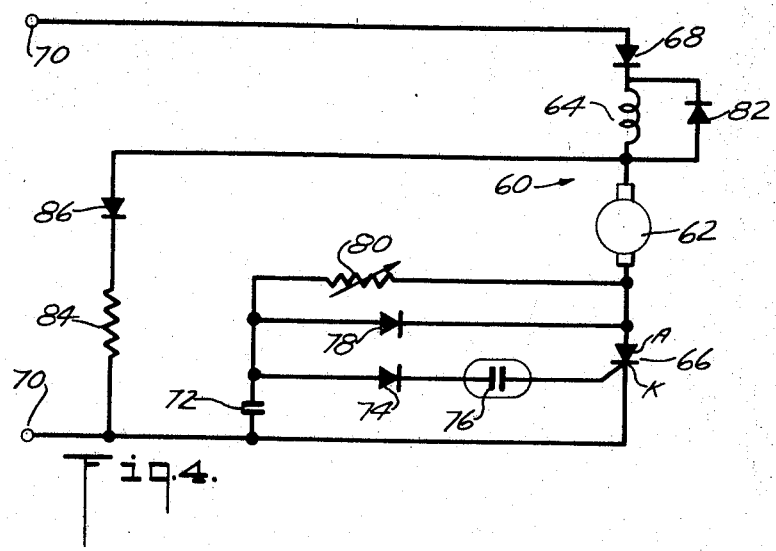
FIG. 4 is a schematic of a circuit forming another embodiment of the present invention.
Figure 8:
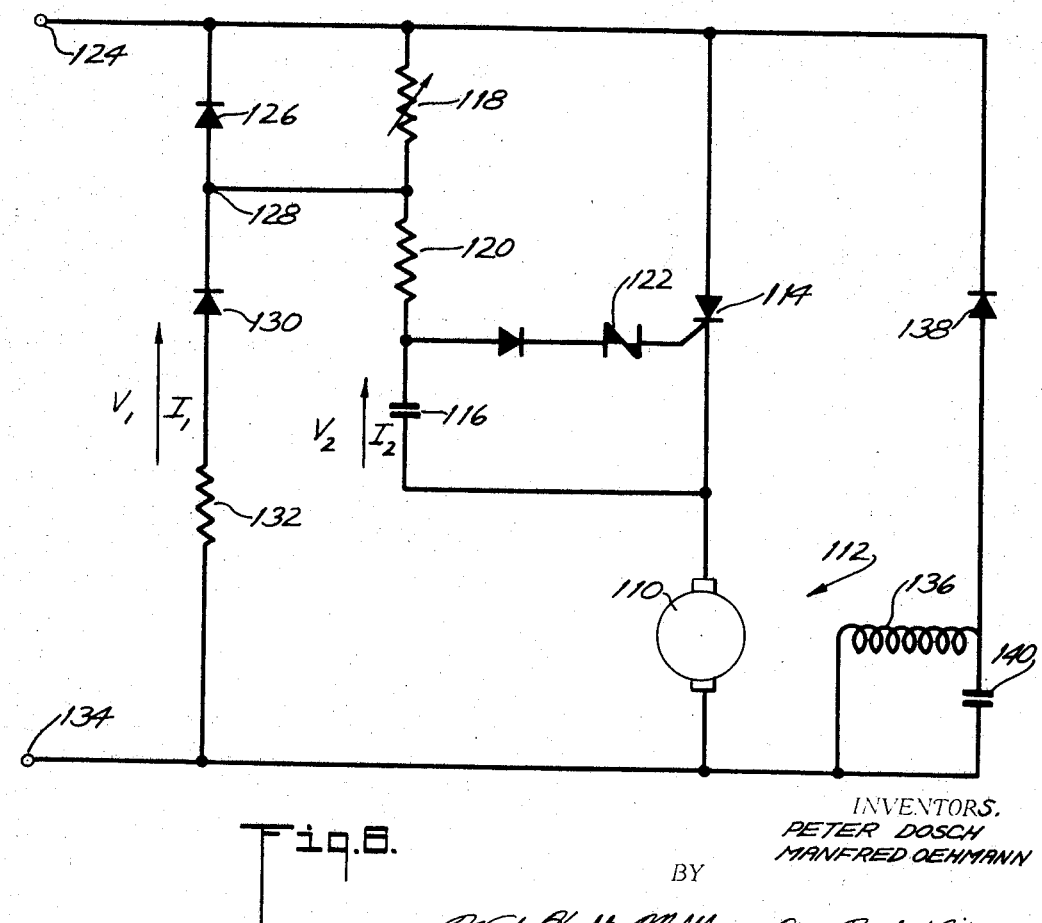

As shown in FIG. 4 a direct current motor 60, has its rotor or armature circuit 62 connected in series with its field coil 64, with the anode-cathode pass A-K of a Thyristor 66 and with a diode 68 between a pair of network input terminals 70. The input treminals 70 are arranged to be connected to a source of A-C electrical power (not shown). As shown, the anode of the diode 68 is connected with one of the input terminals 70 and the cathode K of the Thyristor with the other input terminal. An ignition capacitor 72 is connected on one side to the cathode of the Thyristor 66. The other side of the capacitor is connected via a rectifier 74 and a glow-lamp 76 (serving as a trigger element) to the control electrode of the Thyristor 66. The last mentioned terminal of the capacitor 72 is also connected to the anode of the Thyristor 66 via two separate parallel paths, the one path having interposed therein a diode 78, and the other path having interposed therein a variable resistor 80.

A further diode 82 is connected in parallel with the motor field coil 64. The direction of conductivity of this further diode is opposite to that of the first diode 68. A series circuit consisting of a resistor 84 and a diode 86 is provided in parallel with the series circuit of the motor armature 62 and the Thyristor 66. In this series circuit the diode 86 is arranged so that its direction of conductivity is the same as that of the diode 68 and the Thyristor 66.

The circuit of FIG. 4 operates in the following manner:

The first diode 68 permits current flow only during the period of each half cycle that the upper of the two input terminals 70 is positive with respect to the lower input terminal. At the beginning of this "positive" half period, a small current first flows through the field coil 64, the rotor or armature 62 and the variable resistor 80, thus charging the ignition capacitor 72 so that its upper or control electrode connected terminals becomes positive with respect to its other terminal. As soon as the voltage of the ignition capacitor 72 has reached the ignition voltage of the glow-lamp 76, the resistance of the latter drops, and an impulse current flows through the diode 74, the glow-lamp 76 and the control electrode-cathode path of the Thyristor 66 producing ignition thereof. The moment at which this ignition, (i.e. the phase cut off angle) is reached depends, of course, upon the setting of the variable resistor 80. After ignition of the Thyristor 66, the ignition condenser 72 is discharged via the diode 78 and the anode cathode pass of the Thyristor 66.

At the beginning of the negative half period, the diode 68 and the Thyristor 66 oppose the flow of current through the motor circuits. The magnetic energy stored in the magnetic field of the field coil 64 during this time causes a gradually diminishing current to continue to flow in the field coil 64 and through the diode 82. This diode, it will be seen, functions in a manner analogous to that of the capacitor 24 of the circuit of FIG. 1, in that it sustains energization of the field coil during the negative half waves of the input voltage.

The current flowing through the field coil 64 induces, in the rotor 62, a reverse voltage or counter EMF indicated by the positive and negative signs in FIG. 4.

During the negative half wave the counter EMF drives current through a closed loop consisting of the diode 86, the resistor 84, the ignition capacitor 72 and the diode 78. This current charges the ignition capacitor 72 in a direction such that its upper or control electrode connected terminal is driven to a negative potential. At the beginning of the negative half wave, the rotor counter EMF is at maximum value, although it rapidly diminishes afterwards because of the collapse of current flow in the field coil. The ignition capacitor 72 however, which has nearly attained the initial maximum value of the rotor counter EMF remains substantially at this value because, on one hand, the Thyristor 66 and the diode 74 cease to conduct in the direction of capacitor discharge, and, on the other hand, the diode 86 prevents discharge of the ignition capacitor 72 via the loop comprising the capacitor 72, the resistor 80, the rotor 62, the diode 86 and the resistor 84. This occurs because the rotor counter EMF becomes smaller than the voltage of the ignition capacitor 72. Since the EMF induced in the rotor is proportional with the rotational speed of the rotor, this is also substantially true for the voltage produced across the ignition capacitor 72.

During the following positive half period, current begins again to flow via diode 68, the field coil 64, the rotor 62 and the variable resistor 80. This recharges the ignition capacitor in the opposite direction until it reaches the ignition voltage of the glow-lamp 76. The recharging time is governed by the time constant of the resistor 80 and the ignition capacitor 72, and this in turn established the desired rotational speed of the motor 60. As soon as the ignition capacitor 72 reaches the ignition voltage of the glow-lamp 76. Thyristor 66 is again ignited, and the sequence described above is again repeated.

It can be seen that when the rotational speed of the motor diminishes, for example because of a heavier load, then the rotor counter EMF, and, therefore, also the negative charge imposed across the ignition capacitor 72 becomes smaller. This results in the ignition capacitor reaching the ignition voltage more quickly during the recharging period. The phase cut-off angle is thereby reduced and the average value of the voltage fed to the rotor 1 during the positive half wave period is increased, thereby comparatively increasing the rotor speed.

It will also be noted that during each positive half wave period, a certain amount of current will also flow through the series circuit comprising the diode 86 and the resistor 84. However this current flow is maintained at a minimum value 10, which, however, only causes a quite unimportant loss because of the high ohmic value of the resistor 84, which may for example be in the order of 33 thousand ohms.

Turning now to the circuit of FIG. 5, it will be seen that this arrangement differs from that of FIG. 4 primarily in that the positions of the Thyristor 66 and field coil 64 have been exchanged. Further the diode 68 which in FIG. 4 was in series with the motor armature 62, is replaced in FIG. 5 by a diode 90 connected in series with a variable resistor 92 and an ignition capacitor 94 across the anode and cathode of the Thyristor 66. The ignition capacitor 94, as shown is connected on one side to the cathode of the Thyristor 66; and on the other side, the ignition capacitor is connected via diode 98 and a glow-lamp 100 to the control electrode of the Thyristor. A series circuit comprising the diode 90, a further diode 102 and a resistor 104 is connected in series across the input terminals 70. Another diode 106 is connected in parallel with the adjustable resistor 92 while a still further diode 108 is connected in parallel with the field coil 64.

During operation of the circuit of FIG. 5, the ignition capacitor 94, at the beginning of the negative half wave, is negatively charged with respect to the cathode by virtue of the reverse EMF generated by the rotor 62 and applied through the circuit comprising the diode 106 and 102 the resistor 104 and the diode 108. This negative charge is retained until the end of the negative half wave because of the direction of the diodes 90, 98, 102 and 108 as well as the Thyristor 66. During the positive half wave, the terminal of the ignition capacitor 94 which is situated opposite the Thyristor cathode becomes positive and recharging is effected via the diode 90 and the variable resistor 92. The time required for this recharging will of course depend upon the motor speed for this establishes, by virtue of its reverse EMF, the negative charge on the capacitor which must be overcome during the positive half wave. The rotational speed of the motor is thus regulated to a constant value which is controlled by the adjustment of the variable resistor 92. It will be noted that this regulation of motor speed is effected substantially independently of motor load. When the Thyristor 66 ignites during the positive half wave the ignition capacitor 94 then immediately discharges via the diodes 106 and 102, the resistor 104 and the diode 108.

The circuit of FIG. 5 is especially suited for controlling the speed of higher powered series consisted motors, since the diode 90 is only required to pass small values of current and therefore does not present any cooling problems. The Thyristor 66 on the other hand, must be capable of resisting higher reverse voltages during the negative half wave periods.

The speed-torque characteristics of the series connected motors of FIGS. 4 and 5 are very smilar to those of the previously described shunt connected motors. The power loss in the field coils 64 of the series connected motors is lower however than in the shunt connected motors. This is because in the series connected circuits the current flow through the field coil is minimal during the negative half waves when the motor should be drawing no power.

In the preceding embodiments motor speed is controlled not by simultaneously comparing signals representing the desired and actual speeds, but rather by comparing voltages generated during two different portions of the input voltage cycle. In all of these examples the reverse EMF of electromotive force of the armature, being proportional to the rotational speed of the armature was charged onto a capacitor, always with an equal time constant during the negative input half wave. To make this possible, the resulting circuit together with the motor had to be disconnected from the network by means of a protecting diode in the load circuit.

FIG. 6 shows a modified circuit which operates according to the same basis regulation method as the previously described circuits. The circuit of FIG. 6 however, includes a diode switch operated by input current, and through which the armature EMF produced voltage (which is proportional to motor speed) is charged onto the ignition capacitor. This arrangement has the advantage that the usually needed protection diode in the load current circuit may be eliminated and in that because of the retardation free operation of the diode switch, the motor speed may be regulated or controlled continuously and smoothly, and without knocking while being brought from zero to maximum operating speed.

As shown in FIG. 6, the armature 110 of a motor 112 receives a phase controlled current via a Thyristor 114. An ignition capacitor 116 is connected to be charged via an adjustable resistor 118 and a current limiting resistor 120 during the positive half of the input voltage wave until it reaches the positive ignition voltage of a trigger diode 122, connected between the capacitor 116 and the control electrode of the Thyristor 114. The time at which this triggering occurs depends upon the setting of the adjustable resistor 118. As soon as the ignition or triggering voltage is reached, a current impulse flows via the ignition capacitor 116, a reverse diode 124, the trigger diode 122 and the gate-cathode pass of the Thyristor 114, to fire the Thyristor. The Thyristor then remains conductive up to the end of the positive half of the input wave and thereby short circuits the control network described above to prevent further current from flowing through the resistors 118 and 120. This also prevents further loading of the capacitor 116.

During the negative half of the input wave, a positive EMF remains at the upper terminal of the armature 110 which is connected with the cathode of the Thyristor 114. Since the ignition capacitor 116 is connected on one side with this upper armature terminal, and on their other side with a now negative input terminal 124 via a diode 126 and the relatively low resistance resistor 120, a voltage is applied to the ignition capacitor during the negative half of the input wave due to the conducting condition of the diode 126. This voltage comprises the sum of the input voltage and the armature developed EMF. The time variation of this voltage is represented by curve $V_{2a}$ in FIG. 7.

A negative current $I_2$ accompanies this voltage but very quickly reaches a very high maximum value which is limited only by the AC resistance ($X_{C5}$) of the ignition capacitor 116. At the same time, a sinusoidally varying current $I_1$, the phase of which is identical with the input voltage $V_1$, flows via a diode switch which consists of the diode 126, a switch terminal 128, another diode 130 and a resistor 132 all connected in series across the input terminal 124 and another input terminal 134. At the beginning of the negative half of the input wave, the current $I_2$ flows in the same direction through both the ignition capacitor 116 and through the diode switch resistor 132. Thus these two current components are added in the diode 126. When however the ignition capacitor 116 reaches its maximum voltage, ($V_{1Sp}+E$) at the moment $t_1$ (FIG. 7), the direction of the current $I_2$ via the capacitor 116 becomes positive, whereas the current $I_1$ continues in a negative direction. Accordingly the values of both current components are substracted at the diode 126. Since, because of the dimension formula $R_{11}-X_{C5}$, the amount of the current $I_1$ is higher than the amount of current $I_2$ during the period between $t_1$ and $t_2$, the diode switch continues to remain open. At the moment $t_2$, however, $[I_1]$ becomes equal with $[I_2]$, and the current flow via the diode 126 is interrupted; and the diode switch is reversed because of the different directions respectively the different directions of the currents. At that moment, however, a negative voltage $V_{2a}$ remains on the ignition capacitor 116; and this voltage is proportional to a large extent to the motor EMF when the switching elements are properly valued. As soon as the diode switch reverses, the ignition capacitor 116 is again charged via the adjustable resistor 118 to the positive ignition voltage of the trigger diode 122. As illustrated in FIG. 7, this voltage is reached at moment $t_4$.

What is claimed is:

1. A circuit for phase control regulation of the speed and torque of a direct current shunt field type electrical motor supplied from an alternating current source, said circuit comprising an armature circuit including a first diode, the armature winding of said motor and the anode and cathode of a silicon controlled rectifier connected in series in the order stated across said source, a charging resistor connected between the first diode side of said armature winding and the silicon controlled rectifier side of said source, a capacitor and a second resistor connected in series in the order stated across the cathode and anode of said silicon controlled rectifier, a voltage sensitive trigger element having an impedance characteristic which drops abruptly as the voltage applied thereto exceeds a given breakdown level, said trigger element being connected between the second resistor side of said capacitor and the control electrode of said silicon controlled rectifier and a bypass diode connected across said second resistor with its anode on the capacitor side of said resistor.

2. A circuit as in claim 1 wherein said second resistor is a variable resistor.

3. A circuit as in claim 1 wherein said voltage sensitive element has a Zener breakdown characteristic in two directions.

4. A circuit for phase control regulation of the speed and torque of a direct current shunt field type electrical motor supplied from an alternating current source, said circuit comprising an armature circuit including a first diode, the armature winding of said motor and the anode and cathode of a silicon controlled rectifier connected in series in the order stated across said source, a charging resistor connected between the first diode side of said armature winding and the silicon controlled rectifier side of said source, a capacitor and a second resistor connected in series in the order stated across the cathode and anode of said silicon controlled rectifier, a transistor having its emitter and base coupled together and its emitter and collector connected respectively to the junction point of said capacitor and second resistor and to the control electrode of said silicon controlled rectifier and a bypass diode connected across said second resistor with its anode on the capacitor side of said resistor.

5. A circuit as in claim 4 and having a Zener diode connected across the anode and cathode terminals of said silicon controlled rectifier, the Zener breakdown direction being from the cathode to anode of said silicon controlled rectifier.

6. A circuit as in claim 5 and including a further diode connected in series with said Zener diode and limiting current flow to the Zener breakdown direction of said Zener diode.

7. A circuit as in claim 2 and including a further diode interposed between said capacitor and said transistor and having a direction of higher conductivity toward said transistor.

8. A circuit as in claim 4 wherein said transistor is a trigger transistor of the type whose emitter to collector impedance drops abruptly upon the application to said transistor of a given breakdown voltage.

References Cited

UNITED STATES PATENTS

| | | | |
|---|---|---|---|
| 3,136,900 | 6/1964 | Bell | 307—318 X |
| 3,165,688 | 1/1965 | Gutzwiller | 318—246 |
| 3,184,665 | 5/1965 | Wright | 318—327 |
| 3,191,112 | 6/1965 | Cain | 318—345 X |
| 3,309,594 | 3/1967 | Belt | 318—331 X |
| 3,324,355 | 6/1967 | Gessner | 307—252 X |

ORIS L. RADER, Primary Examiner

H. HUBERFELD, Assistant Examiner

U.S. Cl. X.R.

318—345, 346; 323—4